March 14, 1950 F. T. BAILEY ET AL 2,500,230

REGISTER REGULATOR FOR PRINTING PRESSES

Filed Dec. 10, 1946 3 Sheets-Sheet 1

WITNESSES:
E. A. McClaskey.
Wm. C. Groome

INVENTORS
Francis T. Bailey and
Stephen L. Burgwin.
BY
Paul E. Friedemann
ATTORNEY

REGISTER REGULATOR FOR PRINTING PRESSES

WITNESSES:

E. A. McCloskey

Wm. la Grone

INVENTORS
Francis T. Bailey and
Stephen L. Burgwin.
BY
Paul E. Friedemann
ATTORNEY

REGISTER REGULATOR FOR PRINTING PRESSES

INVENTORS
Francis T. Bailey and
Stephen L. Burgwin.
BY
Paul E. Friedemann
ATTORNEY Patented Mar. 14, 1950

2,500,230

UNITED STATES PATENT OFFICE 2,500,230

REGISTER REGULATOR FOR PRINTING PRESSES

Francis T. Bailey, Pittsburgh, and Stephen L. Burgwin, Forest Hills, Pa., assignors to Westinghouse Electric Corporation, East Pittsburgh, Pa., a corporation of Pennsylvania Application December 10, 1946, Serial No. 715,299

17 Claims. (Cl. 101—181)

Our invention relates to register regulators for printing presses, and more particularly to photoelectrically controlled register regulators for multi-color printing. The invention is related to those of the copending applications Serial No. 715,239 filed December 10, 1946 by L. C. Poole, and Serial No. 715,300, filed December 10, 1946, now Patent No. 2,480,835, by F. T. Bailey and S. L. Burgwin, both assigned to the assignee of the present application.

It is among the objects of the invention to provide a register regulator system which combines improved performance and convenient and accurate adjustability with a simplified photoelectric control equipment as compared with known multi-color register controls. For instance, in known register regulators for four-color printing (yellow, red, blue, black), two photoelectric scanning devices are used for registering each of the red, blue and black impressions with the yellow (first) impression. Hence, a total of twelve scanners would be needed for multi-color printing both sides of the paper web in two subsequently operating groups of printing presses. The appertaining electronic equipment, such as the scanner and mixer circuits, are correspondingly numerous. The invention, therefore, aims at reducing the number of scanning devices as well as the number of circuit elements associated therewith. The invention also aims at improving the circuit connections between the photoelectric scanners and the appertaining electronic mixer circuits so as to secure a high accuracy and fidelity of impulse transmission with a minimum of electronic equipment even if relatively long conductors have to be used between the scanners, located near the individual printing presses, and the centrally located control equipment.

Another object of our invention is to devise the control equipment of a multi-color register control system in such a manner as to facilitate and expedite the adjusting procedure usually necessary when setting the printing press and the register control for a new series of color prints.

Another object of the invention is to improve the control systems for operating the compensator motors in register regulators of the type above-referred to, so that the speed of each individual motor can readily be adjusted, within a wide range, to suit the speed, or the transmission or gear ratio of the driving equipment of each individual press with which the compensator motor is to be associated.

It is also an object of the invention to improve a register regulator, of the type referred to, as regards the accuracy and maintenance of the photoelectrically controlled speed of the register control or compensator motors and also to secure a proper accelerating condition and load limitation for the motors.

These and other objects of the invention will be apparent from the following description of the embodiment shown in the drawings, in which.

Figures 1, 2, 3, 4:
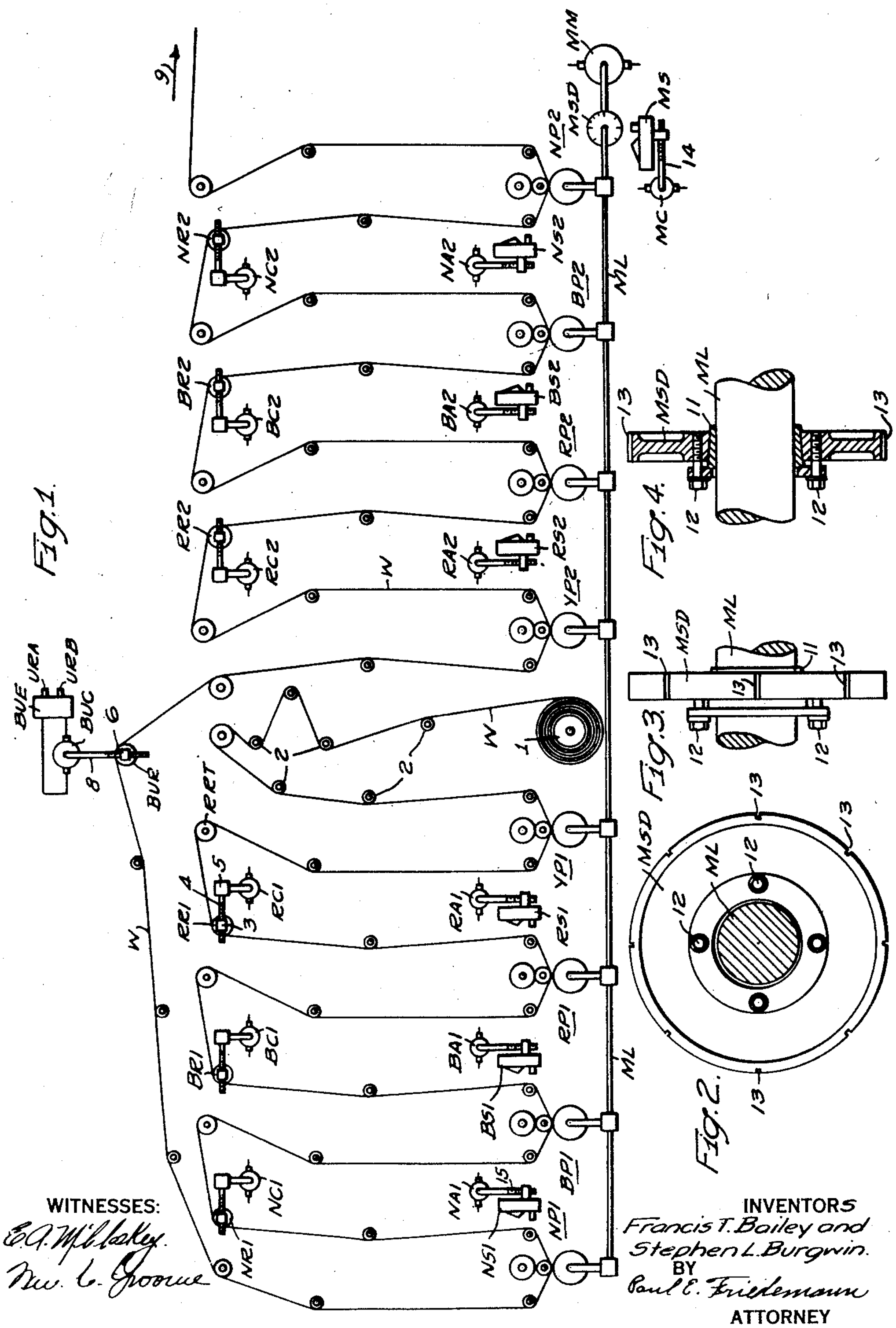
Figure 1 is a schematic representation of dual multi-color printing machinery equipped with a longitudinal register regulator system according to the invention.
Figs. 2, 3 and 4 show a plan view, front view, and cross-section, respectively, of a scanning wheel appertaining to the same register regulator system.

The printing press represented in Figure 1 is designed to produce two multi-color prints on opposite sides of a paper web. The web W travels from a supply wheel 1 over guide rollers, such as those denoted by 2, through the printing press YP1 where the first (yellow) impression is produced. Thence, the web travels over a compensator roller RRT to the "red" printing press RP1. The compensator roller RR1 is horizontally displaceable under control by a reversible motor RC1. To this end, the bearing structure 3 of roller PR1 is engaged by a threaded shaft 4 which is driven from motor RC1 through a gear box 5. Motor RC1 and the bearing structure 3 of compensator roller RR1 remain at rest when the red impression produced in press RP1 is in register with the first (yellow) impression. A displacement of roller RR1 in the horizontal direction causes a lengthening or shortening of the loop formed by the web between the printing presses YP1 and RP1 and, hence, permits shifting the yellow impression in either direction relative to the red impression to be printed in order to establish register.

After leaving the printing press RP1, the web travels over a compensator roller BR1, horizontally displaceable by a compensator motor BC1, through the "blue" printing press BP1 and thence over a compensator roller NR1, horizontally displaceable by a compensator motor NC1, to the "black" printing press NP1. The motors BC1 and NC1 are connected with the appertaining compensator rollers and are controllable in the same manner as the compensator motor RC1 in order to individually lengthen or shorten the loops of web material for the purpose of placing the respective blue and black impressions in accurate register with the yellow impression.

At the end of the above-mentioned travel of the web, the multi-color print is completed on one side of the web. The web then passes over a back-up compensator roller BUR to the yellow printing press YP2 of the second group of printing units. The bearing structure 6 of roller BUR is vertically displaceable by means of a threaded shaft 8 under control by a reversible motor BUC. The appertaining motor control system is represented schematically at BUE. It has two push buttons URA and URB which permit operating the motor BUC in one or the other direction, thereby lifting or lowering the roller BUR. In this manner, the back-up compensator controls the length of the loop extending between the last (black) printing press NP1 of the first group of presses and the first (yellow) printing press YP2 of the second group. This permits an accurate positioning of the second color print, located on the opposite page of the sheet, relative to the first color print. The back-up compensator does not require the high accuracy of adjustment of the other compensating devices and for that reason is controlled separately from the automatic control devices described hereinafter. The back-up compensator is adjusted when setting the machinery for a new printing sequence and, as a rule, requires only little readjustment during the operation of the machinery.

After leaving the yellow printing press YP2, the web travels over a compensating roller RR2, adjustable by a motor RC2, through the "red" printing press RP2, thence over a compensating roller BR2, adjustable by a motor BC2, through the "blue" printing press BP2 and then over a compensator roller NR2, adjustable by a motor NC2, to the "black" printing press NB2 of the second group of presses. When the web leaves press NP2, the print on the other side of the web is completed and the web passes in the direction of the arrow 9 to the folding and cutting equipment (not illustrated). Drying devices may be located between the individual printing presses but are not shown in the drawings because such auxiliary devices are usually employed in machinery of this kind and are not essential to the invention proper.

The individual printing presses of the above-described machine are driven from a common line shaft ML operated by a line shaft motor or prime mover MM.

The compensator motors RC1, BC1, NC1, RC2, BC2 and NC2 are connected to respective motor control systems which permit selectively a manual or automatic control. When these systems are set for automatic control, the compensator motors are governed by a photoelectric scanning system which includes a master scanner or impulse transmitter MS and two groups of "color scanners" denoted by RS1, BS1, NS1 and RS2, BS2, NS2, respectively. The master scanner MS serves to produce periodic electric impulses in synchronism with the operation of the two yellow (master) printing presses YP1 and YP2. To this end, the master scanner MS may be arranged close to one of the "yellow" printing presses, preferably press YP1, so that it is focused onto the web to respond to the register marks at a place shortly behind the press relative to the travel direction of the web. In the illustrated embodiment, however, a different arrangement of the master scanner is represented. As shown, the master scanner MS cooperates with a scanning wheel MSD which is driven in synchronism with the yellow presses. In the illustrated embodiment, the scanning wheel MSD is mounted on the line shaft ML of the printing press and designed in the manner shown in Figs. 2, 3 and 4.

According to Figs. 2, 3 and 4, the scanning wheel MSD sits on a conical bushing 11 which engages the line shaft ML. A fastening device, equipped with a set of tightening screws 12, serves to secure the disc MSD on the bushing while forcing the bushing against the line shaft ML. The scanning wheel may consist of aluminum. Its peripheral or rim portion is preferably sand- or shot-blasted to offer a light-diffusing surface. A number of regularly spaced slots 13, for instance eight, are machined into the peripheral portion of the wheel to form interruptions of the reflective surface. These slots extend in parallel to the wheel axis.

The master scanner MS is focused onto the peripheral surface of the scanning wheel MSD so that the light emanating from the light source of the scanner is reflected back to the scanner from the wheel surface. The slots 13 then cause a complete interception of the light with the result that a corresponding electric impulse is issued by the scanner each time a slot passes through the focal area of the scanner.

The master scanner MS has its housing engaged by a threaded shaft 14 which is controlled by a reversible motor MC to permit a positional adjustment of the scanner and its focal spot relative to the path of movement of the wheel periphery.

The "color" scanners are displaceable in parallel to the web movement under control by reversible motors RA1, BA1, NA1, RA2, BA2 and NA2. To this end, each scanner, for instance as shown for scanner NS1, is engaged by a threaded shaft 15 which is connected to the armature of the appertaining motor NA1. Each yellow printing press imprints a series of small linear register marks in equally spaced intervals, these marks occurring in fixed positional relation to the scanning slots 13 in the scanning wheel MSD. When these marks pass through the focal spot of the color scanners, they cause these scanners to issue respective series of impulses. When these "color" impulses occur in a given time relation to (preferably simultaneously with) the impulses from the master scanner MS, the color impression in the appertaining press unit is in exact register with the yellow imprint. In order to have the regulator maintain such an exact register, an accurate adjustment of each scanner relative to the printing place of the appertaining color impression is required, and the above-described means for individually displacing the scanners in parallel to the path of web travel permit making such adjustments more readily and within shorter time that it has heretofore been possible in known multicolor register regulators.

It should be noted that, according to the invention, only one impulse transmitter, namely, the master scanner MS, is used to provide the reference impulses for both groups of printing presses and that, in addition, only one color scanner is employed for the red, blue and black printing units respectively of each group. Consequently, the total number of scanners amounts to only seven as compared with the twelve scanners required for dual-page multi-color presses according to the above-mentioned known system. It will be understood that, by virtue of the present invention, the design and extent of the appertaining electric circuit device is correspondingly reduced, thus resulting in an overall simplification of systems of this kind and also in the elimination of possible sources of trouble, thus affording an improved reliability of operation.

Figure 5:
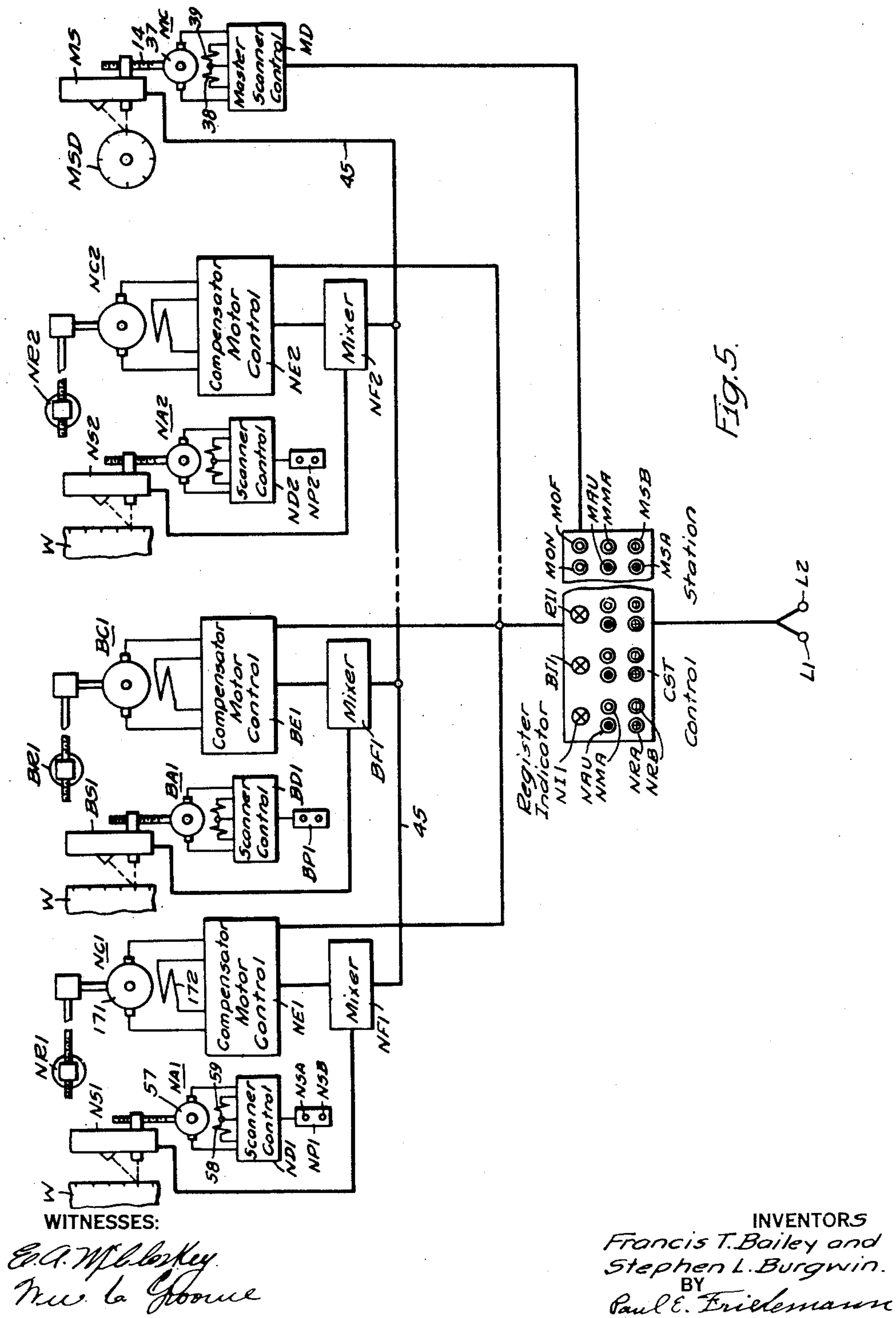
Fig. 5 is a diagrammatic representation of several control units and external connections appertaining to the system.

Fig. 5 is essentially an explanatory block diagram and, aside from the devices appertaining to the master scanner MS, includes only the devices associated with three of the color scanners. According to Fig. 5, the entire system is energized from line terminals L1 and L2 for connection to an alternating-current line. The energization of the system as a whole is controlled by contact devices whose control elements include four push-button contacts MON, MOF, MAU, MMA that are located in the panel of a central control station CST. The compensator motors, such as motors NC1, BC1 and NC2 shown in Fig. 5, are controlled by individual motor control units, such as those represented at NE1, BE1 and NE2, respectively. Associated with each motor control unit is a group of four push-button contacts located in the control station CST, such as the push buttons NAU, NMA, NRA and NRB appertaining to the motor control unit NE1. Located above this group of push buttons is a register indicator NI1, and similar indicators, such as those denoted by BI1 and RI1, are located in the control station CST above the respective other groups of motor control buttons.

The control unit for the adjusting motor MC, appertaining to the master scanner MS, is shown schematically at MD in Fig. 5. This control unit MD is associated with push buttons MSA and MSB which are located in the panel of the control station CST and serve to operate motor MC in one or the other direction (ahead or back).

The motor control systems for the other scanner adjusting motors, such as motors NA1, BA1 and NA2, are schematically shown at ND1, BD1 and ND2, respectively. Each of these scanner control units is equipped with a push-button station, such as those denoted by NP1, BP1 and NP2. These stations are preferably located near the central control station or may form part thereof. Each push-button station has two buttons, such as those denoted by NSA and NSB in station NP1, to operate the appertaining motor for moving the scanner ahead and back, respectively.

When the system is set for automatic control, the control units NE1, BE1, etc. for the individual compensator motors are under control by electronic mixers, such as those shown schematically at NF1, BF1 and NF2 in Fig. 5. The master scanner MS is connected to all mixers. Each mixer is also connected to one of the color scanners respectively. In the mixer NF1, for instance, the impulses from the master scanner MS are compared with those coming from the color scanner NS1. If the impulses occur simultaneously, the compensator motor NC1 controlled by the mixer NF1 remains at rest. When the impulses occur at different moments, the compensator motor NC1 is caused to move in one or the other direction depending upon whether the impulses from the color scanner NS1 lag or lead those from the master scanner MS. This will be more fully understood from the following.

For the purpose of a detailed description, it appears convenient to distinguish between several system components and to describe them separately although these components are interlinked and cooperate with one another so that their separate description necessitates some overlapping. The following components or groups of components are described hereinafter in the order here given:

1. Photoelectric scanners,
2. Mixer unit,
3. Register indicator,
4. Control contactors,
5. Motor field control,
6. Motor armature control.

It will be noted that the description of the controls for the scanner adjusting motors is included in that of the scanners, and that when describing the compensator motor control systems, a distinction is made between the appertaining field control circuits and armature control circuits.

1. *Photoelectric scanners*

Figure 6:
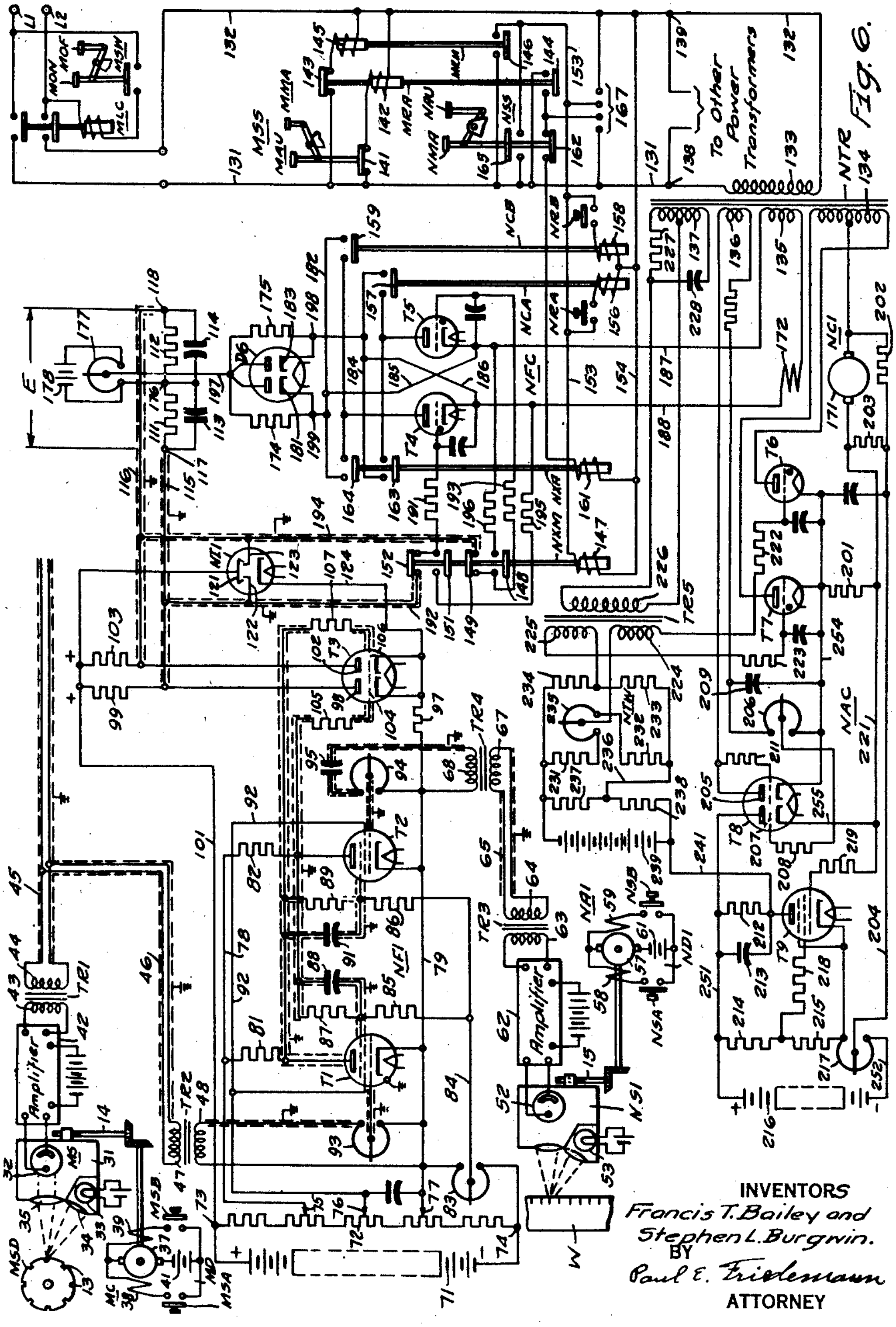
Fig. 6 shows in detail a group of correlated and interconnected circuit diagrams also relating to the register regulator system of the multi-color press according to Fig. 1.

The upper left corner area of Fig. 6 shows the master scanner MS, the appertaining motor MC and the control unit MD for motor MC. The housing 31 of the master scanner contains a photoelectric tube 32 and a light source 33. The light from source 33 is focused by an optical system 34 onto the scanning wheel MSD. The photo tube 32 is focused by an optical system 35 onto the focal spot of system 34. Hence, the photo tube 32 is illuminated by reflected light from the surface of the scanning disc MSD, and this light is intercepted each time a slot 13 of wheel MSD passes through the focal area. The housing 31 of scanner MS is adjusted by the threaded shaft 14 under control by the armature 37 of motor MC. This motor has two field windings 38 and 39 and receives energization from a suitable current source 41 under control by the normally open push-button contacts MSA and MSB which are identical with those shown in the control station CST in Fig. 5. The output from photo tube 32 (Fig. 6) is amplified by an electronic amplifier 42 and applied to the primary 43 of an impedance-matching step-down transformer TR1 whose secondary 44 is connected to a cable 45 which is preferably shielded and may contain twisted conductors. This cable is connected with all mixer units of the system. For instance, according to Fig. 6, a shielded branch cable 46 connects cable 45 to the primary 47 of an impedance-matching step-up transformer TR2 whose secondary 48 represents one of the two input elements of the mixer NF1.

Only one of the color scanners is shown in Fig. 6, namely, the color scanner NS1 associated with the "black" printing press NP1 (see Fig. 1). The housing of color scanner NS1 is equipped with a photo tube 52 (Fig. 6) and a light source 53, both focused on the marginal register marks imprinted on the web W. The motor NA1 for adjusting the scanner NS1 has two field windings 58 and 59 to operate in one or the other direction depending upon which field winding is energized at a time. A suitable current source 61 provides energization for armature 57 of motor NA1 under control by normally open push-button contacts NSA and NSB which are identical with those denoted by the same reference characters in Fig. 5. The output of photo tube 52 is passed through an amplifier 62 (Fig. 6) and applied to the primary 63 of a step-down impedance-matching transformer TR3 whose secondary 64 is connected through a shielded cable 65 with the primary 67 of an impedance-matching step-up transformer TR4. The secondary 68 of transformer TR4 represents the other input element of the mixer NF1.

The impedance-matching transformers TR1, TR2 and TR3, TR4 afford the advantage that the distributed capacitance of the connecting leads between the scanners and the centrally located mixer units becomes virtually negligible as regards its disturbing influence on the fidelity and accuracy of impulse transmission. Therefore, the above-described connections between scanners and mixer contribute to achieving the desired accuracy and reliability of control performance.

The particular design of the scanners and of the appertaining adjusting devices is not essential to the present invention. For instance, if desired, the amplifiers (42, 62) may be eliminated when using a photoelectric tube of the electron-multiplier type as shown in our above-mentioned copending application, Serial No. 715,300, and the scanner adjusting means may also be designed in accordance with that application.

2. *Mixer unit*

The mixer NF1 comprises an electronic trigger circuit with alternately conductive trigger pentodes T1 and T2. The power source for the trigger circuit is represented at 71 and includes a voltage divider 72 with terminals 73, 74 and taps 75, 76 and 77.

The plate voltage for tubes T1 and T2 is obtained from the voltage divider 72, between taps 75 and 77 and the respective leads 78 and 79. Lead 78 is connected through plate load resistors 81 and 82 to the anodes of tubes T1 and T2, respectively.

The suppressor grids of tubes T1 and T2 are impressed by negative bias from a rheostat 83 through a lead 84 and through resistors 85 and 86, respectively. Nullifying voltage of positive polarity is applied to the suppressor grid of tube T1 through resistor 87 from the plate of tube T2, a capacitor 88 being connected across resistor 87. Nullifying voltage of positive polarity is applied to the suppressor grid of tube T2 through resistor 89, with bypass capacitor 91, from the plate of tube T1. Capacitor 88 serves to neutralize the inter-electrode (suppressor-plate) capacitance of tube T2, while capacitor 91 has a corresponding function relative to tube T1.

Screen voltage for tubes T1 and T2 is derived from tap 76 of voltage divider 72 through a lead 92 which is positive with respect to the common cathode lead 79 of the two tubes.

The voltage for the control grid for the tube T1 is taken from across an adjusted portion of a rheostat 93 connected to the secondary 48 of the input transformer T2. Hence the control grid of tube T1 is under control by the impulses from the master scanner MS. The control grid of tube T2 is connected through a rheostat 94 and a capacitor 95 to the secondary 68 of the input transformer TR4 to be impressed by the impulses from color scanner NS1.

Since the bias voltages normally effective at the suppressor grids of trigger tubes T1 and T2 are negative with respect to the tube cathodes, and since, with rheostats 93 and 94 properly adjusted, the bias voltage at the control grids of both tubes is normally zero, positive impulses or half waves impressed on the control grids from transformers TR2 and TR4 do not influence the plate current of tubes T1 and T2. However, the arrival of a negative impulse at the control grid of one tube will transfer the plate current from that tube to the other tube. For example, a negative impulse impressed on the control grid of tube T1, due to the passage of a scanning wheel slot through the focal spot of master scanner MS, interrupts the flow of plate current in tube T1. The anode of tube T1 becomes more positive relative to the common cathode lead 79. The suppressor grid of tube T2 becomes less negative, relative to the cathode lead 79, and causes the tube T2 to conduct more plate current. This increase of plate current in tube T2 causes its anode to assume a reduced positive voltage with respect to the cathode lead 79. As a result, the suppressor grid of tube T1 becomes more negative with respect to the cathode lead and maintains tube T1 in non-conductive state. Tube T1 then remains non-conductive until its negative suppressor voltage is removed by the interruption of the plate current in tube T1 due to the arrival of a negative impulse, at the control grid of tube T2, from the transformer T4 of color scanner NS1. Then, the flow of plate current is transferred back to tube T1.

If negative impulses are simultaneously impressed on the control grids of tubes T1 and T2, the tubes conduct alternately, and the above-described transfer of plate current occurs each time the impulses are received from the two scanners. This condition obtains when the color impression (of press NP1, see Fig. 1) is in register with the yellow impression (at press YP1). Since the slots 13 of the scanning wheel MSD and the printed register marks on the web W are spaced equally and in proper relation to each other, the successive periods of conductance are equal; and these periods become unequal only as a result of misregister.

The voltage drops across the load resistors 81 and 82 of tubes T1 and T2, respectively, are at a maximum when the appertaining tube conducts and at a minimum when the tube is blocked. These voltage pulses are applied to the respective two sections of a dual triode T3.

The dual triode T3, which may be replaced by two individual triodes if desired, couples the above-described trigger tube circuits to the field control system MFC of motor NC1. Tube T3 acts as a direct-current transformer and prevents the alternating current in the motor field control tubes from interfering with the direct current in the trigger tube circuits. Both cathodes of tube T3 are connected to cathode lead 79 through a resistor 97. The plate 98 of one section of tube T3 is connected to the positive terminal 73 of rheostat 72 through a load resistor 99 and a lead 101. The plate 102 of the other section of tube T3 is connected to lead 101 through load resistor 103. The control grid 104 of the first tube section is connected through a resistor 105 to the plate of trigger tube T2. The control grid 106 of tube T3 is connected through resistor 107 to the plate of trigger tube T1. The grid circuit of the first (left) section of tube T3 extends as follows:

Grid 104—105—82—78—75—72—77—79—97—first cathode of T3

This grid circuit includes two voltage sources, namely, the portion of rheostat 72 between points 75 and 77 which provides a constant voltage, and the load resistor 82 of trigger tube T2 which provides a variable voltage drop whose condition depends on whether tube T2 is conductive or nonconductive. Similarly, the second grid circuit of tube T3 extends as follows:

Grid 106—107—81—78—75—72—77—79—97—second cathode of T3

This grid circuit includes the constant voltage source 72 (between points 75 and 77) and the load resistor 81 which acts as a source of variable voltage controlled by tube T1. Hence, which of the two sections of tube T3 conducts time depends on which of the two trigger tubes is conductive. Consequently, the amplified voltage drops appearing across the respective load resistors 97 and 103 of tube T3 are likewise dependent upon which of the two trigger tubes is conductive. Since the trigger tubes are alternately triggered, amplified voltages will appear alternately across resistors 99 and 103. Connected across resistors 97 and 103 is a coupling circuit which includes two resistors 111 and 112 each shunted by a smoothing capacitor 113 or 114. This coupling circuit extends as follows:

99—115—111/113—112/114—116—103—99

The two load resistors 99 and 103 in this circuit represent two series-opposed voltage sources. In consequence, during half-wave periods in which load resistor 99 is traversed by current from plate 98 of tube T3, the voltage impressed by resistor 99 across terminal points 117 and 118 of resistors 111 and 112 has one direction, and during the other half-wave period, when load resistor 103 is traversed by current from plate 102 of tube T3, the voltage impressed by resistor 103 across terminal points 117 and 118 has the opposite direction. During the just-mentioned half-wave periods, the respective capacitors 113 and 114 are charged. In the intermediate half-wave periods, the capacitor 113 or 114 discharges. As a result, the resultant voltage E that appears between terminal points 117 and 118 is approximately constant and unidirectional. When the register marks responded to by the color scanner NS1 are in proper register with the impulses from the master scanner MS, the alternating conductive periods of the trigger tubes T1 and T2 have equal duration so that the resultant voltage E is zero. When the response of the color scanner NS1 is out of synchronism with that of the master scanner MS, the periods of conductance of tubes T1 and T2 become unequal so that the voltage E assumes a finite value whose magnitude and polarity depend upon the extent and direction of the misregister. As will be explained below, the occurrence and polarity of the voltage E are used for governing the control of the compensator motor NC1 in the sense required to reestablish register.

3. *Register indicator*

The register indicator NI1 (Figs. 5 and 6) consists substantially of a small cathode ray tube with an anode 121 on which a luminous butterfly pattern appears which can be deflected to either side by deflector electrodes 122 and 123. The cathode of tube NI1 is connected, by lead 124, to the cathodes of the amplifier tube T3. The deflector electrodes 122 and 123 are connected to the two anodes 98 and 102, respectively, of the tube T3, and the anode 121 of tube NI1 is connected to a point between the two load resistors 99 and 103. When the yellow and black impressions are in register so that the impulses from master scanner MS and color scanner NS1 occur simultaneously, the voltages across resistors 99 and 103, as explained, are equal. As a result, the shadows cast by the deflector electrodes onto the anode 121 of indicator tube NI1 appear to be equally distributed over both sides of the anode surface, and, due to persistence of vision, a symmetrical pattern of light is exhibited. When the impulses from master scanner and color scanner are not simultaneous, due to the occurrence of misregister, the ray control voltages at electrodes 122 and 123 are unequal so that the luminous pattern becomes asymmetrical and leaves one or the other side of the anode 121 in indicator tube more or less shaded. In this manner, the tube NR1 exhibits the occurrence and direction of misregister.

4. *Control contactors*

The control units ND1, BD1, etc. (see Fig. 5), all energized from common power supply terminal, are under control by common master control devices. These master devices are designated by reference characters prefixed by the letter M, in distinction from units, prefixed by N, that appertain only to the "black" color scanner and associated mixer and compensator motor and hence are duplicated in each individual control system associated with the respective other color scanners and compensator motors. The common master control devices, aside from the above-described master scanner MC and scanning disc MSD, comprise a main switch MSW, and a master selector switch MSS associated with main relays MRA and MRM (Fig. 6).

The main switch MSW is provided with two push buttons MON and MOF (Figs. 5, 6) located in the panel of the control station CST (Fig. 5) and controls the supply of power from the line terminals L1, L2 (Figs. 5, 6) either directly or, as shown, by a line contactor MLC (Fig. 6). When push button MON is depressed, the main buses 131 and 132 are connected to the line terminals L1, L2; when button MOF is depressed, as shown, the buses 131 and 132 are deenergized.

Connected across buses 131 and 132 is the primary 133 of a power transformer NTR with four secondaries 134, 135, 136 and 137. Transformer NTR provides energization for the motor control devices appertaining to the compensator motor NC1 (Figs. 1, 5, 6). The corresponding power transformers for the other compensator motors (BC1, RC1, RC2, BC2, NC2, see Fig. 1) are also connected to the buses 131 and 132 in parallel to one another (not shown) and in parallel to the illustrated transformer NTR. For instance, these other transformers may be connected across the circuit points marked 138 and 139 in Fig. 6. Hence when button MON of master switch MSW is depressed, the power transformers for all compensator motors are energized.

The master selector switch MSS has a contact 141 (Fig. 6) controlled by the two push buttons MMA and MAU (Figs. 5, 6) located in the panel of the control station CST (Fig. 5). When button MAU is depressed, contact 141 is closed (Fig. 6) and energizes the coil 142 of the main control relay MRA which then opens a contact 143 and closes a contact 144. The entire register regulator is then set for automatic control of the compensator motors. When bush button MMA of master selector switch MSS is depressed, coil 142 of relay MRA is deenergized and contact 143 energizes the coil 145 of main control relay MRM which then closes a contact 146 to set all compensator motors for manual control.

When the system is set for manual operation, by actuation of push button MMA and the closing of contact 146 in relay MRM, the coil 147 of a relay NXM with four contacts 148, 149, 151 and 152 is energized across the buses 131 and 132 in the circuit 131—146—153—147—154—132 and adjusts the control system of compensating motor NC1 for manual operation. This manual operation is then dependent upon the actuation of push buttons NRA and NRB (Figs. 5, 6) which are located in the panel of the control station CST (Fig. 5), underneath the apertaining register indicator NI1. With both buttons NRA and NRB unactuated, the motor NC1, when set for manual control, remains at rest. Actuation of button NRA causes the coil 156 of a relay NCA to close a contact 157 with the result of causing motor NC1 to move the compensating roller NR1 in the direction to shift the black color impression ahead in the travel direction of the web. When button NRB is depressed, the coil 158 (Fig. 6) of a relay NCB is caused to close a relay contact 159 in order to cause motor NC1 to move the compensating roller in the other direction (back).

When the system is set for automatic operation, by actuation of button MAU and the closing of contact 144 in relay MRA, the coil 161 of a control relay NXA is energized across buses 131 and 132 in the circuit 131—144—162—161—154—132 and closes in relay NXA the contacts 163 and 164, thus placing the motor control in condition for an automatic regulating performance of the compensator motor NC1. The last-mentioned circuit includes the contact 162 of a unit selector switch NSS which has another contact 165 and is actuated by the push buttons NMA and NAU also shown in Fig. 5 to be located in the control station CST underneath the "black" register indicator RI1. The last-mentioned circuit is closed only when the "automatic" button NAU is depressed.

If the master selector switch MSS is set for "automatic" performance (button MAU depressed, contact 144 closed, contact 146 open), the motor NC1 can nevertheless be set individually for manual control by depressing the button NMA of switch NSS (Fig. 6). As a result, the circuit of coil 161 in relay NXA is interrupted at contact 162, while coil 147 of relay NXM is energized due to the closing of contact 165. Buttons NRA and NRB can then be actuated for adjusting the motor NC1 independent of the automatic compensating operation that may then be performed by any of the other compensator motors.

While, as mentioned before, the master control devices (MSW, MSS, MRA, MRM) occur only once and are common to all compensator motor control systems, the individual control systems for the other compensator motors (see BC1, RC1, RC2, BC2, NC2 in Fig. 1) are equipped with contactor devices of a design, arrangement and function similar to those of the devices denoted in Fig. 6 by NSS, NRA, NRB, NCA, NCB, NXM and NXA, and these corresponding devices of the other motor control systems are connected, in parallel to one another, to the four terminals shown in Fig. 6 at 167, and these other devices are operative in the manner described above with reference to the respective contact devices of the illustrated control system for motor NC1.

In summary, when buses 131 and 132 and all power transformers are energized by actuation of button MON in switch MSW, and with the master selector switch MSS set on "manual" (button MMA depressed), the individual compensator motors are inoperative as long as the "automatic" button (for instance NAU) of the appertaining unit selector switch (for instance NSS) is depressed, but are individually made subject to manual adjustment (by buttons NRA and NRB, for instance) when the unit selector switch is set on "manual" (by depressing button NMA of NSS, for instance).

On the other hand, when the master selector switch MSS is set on "automatic" by depressing the button MAU, the individual motor controls can either be operated automatically or manually, depending upon the selected setting of the respective unit selector switches (NSS, for instance). This permits the following starting method. With the printing machinery running at low or threading speed, the completed color prints are observed as to the occurrence of misregister. Any such misregister is at first coarsely converted, while the master and unit selector switches are set on "manual," by actuating the push buttons of the individual register regulator motors (such as button NRA or NRB). After the machine is coarsely adjusted in this manner, it is operated at the higher (manual) speed. If desired, but not necessarily, the coarse adjustment is then repeated for some or all press units. During this procedure the position of scanners is not changed. Thereafter, the master selector switch MSS is set on "automatic" while all unit selector switches remain at first on "manual." The operator now observes the register indicator (for instance NI1) of each individual unit and eliminates any remaining misregister in that unit by adjusting or calibrating the position of the scanners. This is done by actuating, if necessary, the push buttons of the scanner motors, such as button NSA or NSB, until the register indicator shows a symmetrical luminous pattern. (The master scanner, once properly positioned, need not, as a whole, be shifted during the just-mentioned procedure.) When an individual unit is properly adjusted, the appertaining color impression is in accurate register with the yellow (master) impression, and the operator sets the selector switch of that unit on "automatic" (for instance, by depressing button NAU of switch NSS), thus transferring the unit to automatic operation. The operator then repeats the procedure with each of the other units until all of them operate automatically. However, if thereafter a major misregister should occur in any unit, the operator may turn that unit back to manual adjustment by actuating the unit selector switch (for instance NSS) and he can then eliminate the misregister by manual control without interfering with the continuing automatic operation of the other units. At any time, in the event of a comprehensive disturbance or for the purpose of repairs, the whole system can immediately be returned to manual by setting the master selector switch MSS on manual.

5. *Motor field control*

The armature 171 of compensator motor NC1 (Fig. 6) is energized by rectified current from the secondary 134 of power transformer NTR. The motor field winding 172 receives rectified excitation from the secondary 135 of transformer NTR. A rectifying and control equipment, denoted as a whole by NAC and to be described in a later place, takes care of maintaining the armature 171 under proper voltage and current conditions, while the running and stopping, as well as the running direction, of the motor are controlled by control equipment for the motor field winding 172, the latter equipment being denoted as a whole by NFC and described presently.

Aside from the above-mentioned relays NXM, NXA, NCA, NCB and the associated contacts NRA, NRB, NSS, the field control system includes two gaseous discharge tubes, for instance thyratrons T4 and T5, and a dual diode D6 shunted by two resistors 174 and 175. The interconnected anodes of the dual diode D6 are attached to a point 176 between the resistors 111 and 112, in series with a direct-current source whose effective voltage is determined by the position of the slider of a rheostat 177 energized from a suitable voltage source 178. One cathode 181 of tube D6 is connected through a lead 182 to the anode of thyratron T4 under control by relay contacts 159 and 164. The other cathode 183 is connected, through a lead 184, to the anode of thyratron T5 under control by relay contacts 157 and 163. The anode of tube T4 is connected through lead 185, under control by contact 159, to the cathode of tube T5, and another lead 186 connects the anode of tube T4 with the cathode of tube T5 under control by contact 157.

When relay NXM is deenergized, the control grid of tube T4 is connected through a resistor 191, relay contact 152 and lead 192 to the terminal point 117 of resistor 111, while the control grid of tube T5 is then connected through a resistor 193, relay contact 149 and lead 194 to the terminal point 118 of resistor 112. With these grid connections, and since then the relay NXA has its contacts 163 and 164 closed, the thyratrons T4 and T5 are under control by the above-mentioned mixer output voltage E across resistors 111 and 112.

When relay NXM is energized, the grids of tubes T4 and T5 are disconnected from the coupling circuit of resistors 111 and 112 and, hence, not subject to automatic control by the mixer output voltage E. Instead, the grid of tube T4 is now connected through resistor 191, contact 151 and a resistor 195 to the cathode of the same tube and, hence, not negatively biased so that tube T4 is capable of conductance during the half-wave periods in which the alternating voltage from the secondary 135 of the power transformer NTR has the suitable polarity. Under the same conditions, the grid of tube T5 is connected through resistor 193, contact 148 and a resistor 196 to the cathode of tube T5, so that the latter tube is capable of conductance in the half-wave periods of opposite polarity.

The field control system operates as follows: Assume that the selector switch NSS is set for manual operation (button NMA depressed), then the relay NXA is deenergized, as shown, while relay NXM is energized and, at contacts 149 and 152, disconnects the thyratron grid circuits from the coupling resistors 111 and 112. Suppose the operator, by observing the register indicator NI1 or by direct inspection of the color print, notices that the black impression from press NP1 is out of register with the yellow impression and lags behind the latter impression, then he will push the button NRA in order to move the black impression ahead on the web into register with the yellow impression. As long as button NRA is held depressed, the relay is picked up and closes at contact 157 the following circuit for field winding 172: 135—172—188—186—157—T5—187—135. Hence, field winding 172 receives excitation during each second half period of the alternating-current voltage and this excitation is of the polarity needed to operate the motor NC1 in the desired direction. The tube T4 remains inoperative because its plate circuit is interrupted at contacts 159 and 164. The motor stops as soon as button NRA is released.

When the misregister is in the opposite direction, the operator depresses the button NRB so that relay NCB closes its contact 159. Now, the field winding 172 is excited in the circuit: 135—187—185—182—159—T4—188—175—135. This excitation is effective in the half-wave periods of opposite polarity, while tube T5 remains non-conductive because its anode circuit is interrupted at contact 157. Consequently, the field winding 172 causes motor NC1 to run in the direction required to move the black impression back toward register with the yellow impression.

Considering now the automatic performance, it is assumed in the following that the selector switches MSS and NSS are both set on "automatic" (buttons MAU and NAU depressed) so that relay NXA is picked up and closes contacts 163 and 164, while relay NXM remains dropped out, as shown. The two thyratrons T4 and T5 are now connected in the field circuit in inverse relation to each other but their conductance depends now on the condition of the mixer output voltage E across resistors 111 and 112. The just-mentioned field circuit can be traced as follows:

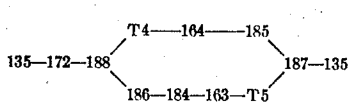

The circuit branch containing tube T4 is capable of conductance only in one half-wave period of the alternating plate voltage and the branch of tube T5 only during the other half-wave period, such conductance being dependent, however, upon the grid voltage then effective in either tube.

The grid circuit of tube T4, under the just-mentioned setting, extends as follows:

Grid of T4—191—152—192—115—117—111—176—177—197—T6/175—198—186 cathode of T4 (A)

The grid circuit of tube T5 can be traced as follows:

Grid of T5—193—149—194—116—118—112—176—177—197—D6/174—199—185—cathode of T5 (B)

The combination of dual diode D6 and shunt resistors 174, 175, which forms part of these grid circuits provides two resistance paths whose respective resistance values are determined by the polarity of the tube T3. This combination D6—174—175 serves as an auxiliary to allow a common cathode connection of the thyratrons T4 and T5 with the mixer coupling circuit so that each thyratron (T4, T5) can be separately impressed by a voltage between grid and cathode, the tube subjected to this voltage being determined by the circuit condition of the trigger tubes (T1, T2).

The above-recited grid circuit (A) of tube T4 contains two sources of grid voltage, namely, the tapped-off portion of rheostat 177 which provides a constant voltage drop of adjusted magnitude, and the coupling resistor 111 which provides a variable and reversible control voltage $$\left(+\frac{E}{2}\right)$$

proportional to the above-mentioned voltage E.

The grid circuit (B) of tube T5 includes also two voltage sources, of which one is identical with the tapped-off portion of rheostat 177 to provide a constant grid bias, while the other source is represented by the coupling resistor 112 to provide a variable and reversible control voltage $$\left(-\frac{E}{2}\right)$$

proportional to voltage E. As mentioned above, the voltage E is zero as long as the yellow impression and the color impression are in register but assumes a finite value of one or the other polarity during the existence of misregister. In the latter event, the finite control voltage $$\left(+\frac{E}{2}\right)$$

across resistor 111 in the grid circuit of tube T4 has a polarity relative to the constant bias voltage (Ec) that is opposite to the corresponding relative polarity of the control voltage $$\left(-\frac{E}{2}\right)$$

in the grid circuit of tube T5. Consequently, at a moment when the voltage E, due to misregister, has such a polarity as to increase the firing angle of tube T4, it has the simultaneous effect of decreasing the firing angle of tube T5, or vice versa.

The tubes T4 and T5 conduct alternately during equal half-wave periods as long as the voltage E is zero, i. e., as long as the impulses from the color scanner NS1 occur simultaneously with those from the master scanner MS. Thus a balanced alternating current is passed through the field winding 172 of motor NC1 so that the motor remains at rest. If, due to misregister, the impulses fall out of step so that voltage E assumes a finite value of corresponding polarity, then one of the tubes, during each cycle period, conducts a longer period of time than the other so that a net flux is effective in the motor field, and the motor NC1 is caused to revolve in the direction required to reestablish register.

6. *Armature control system*

The speed and torque of the compensator motor NC1, for any given control condition of the field control system NFC, depend on the energizing conditions of the motor armature 171, and it is the purpose of the illustrated armature control system NAC (Fig. 6) to regulate the armature energization for securing a substantially constant operating speed regardless of load variations, and to permit adjusting the speed to any desired value within an available speed range in order to adapt the equipment to the exact speed requirements, under consideration of any intermediate gear or transmission ratios, of each individual printing press. Another function of the armature control system NAC is to automatically limit the armature current to a selected maximum value to secure a proper acceleration and load limitation.

The armature control system NAC has two thyratrons or the like gaseous discharge tubes T6 and T7 to supply full-wave rectified voltage to armature 171 from the mid-tapped secondary 134 of the power transformer NTR. Series-connected between tubes T6, T7 and motor armature 171 is a low-ohmic resistor 201 which provides a reference voltage (Ec) for the current-limit control circuit described below. Two mutually series-connected resistors 202 and 203, with their common midpoint tapped by a lead 204, form a voltage divider across the armature to provide a reference voltage (Es) for speed control.

A dual triode T8, replaceable by two separate tubes if desired, operates as a current-limiting device. One section of tube T8, including the plate 205 is energized from the secondary 136 of power transformer NTR through the resistor of a potentiometer rheostat 206 and serves as a rectifier to supply a direct-current grid bias to the second section of tube T8. To this end, the control grid 207 of the second tube section is connected, in series with a resistor 208, to the slide contact of the rheostat 206. A capacitor 209 across rheostat 206 serves as a filter or smoothing device, and a resistor 211 connects the anode 205 to the appertaining grid. The rheostat 206 permits adjusting the desired maximum limit for the armature current of motor NC1.

A pentode T9 operates as a device for controlling the voltage of the rectified current from tubes T6 and T7. The plate circuit of tube T9 includes a load resistor 212, shunted by a capacitor 213, and is energized from a voltage divider arrangement of two resistors 214, 215 which are traversed by current from a suitable source 216. Series-connected to resistors 214 and 215 is a potentiometer rheostat 217. Rheostat 217 has its slider connected to the mid-point lead 204 of the above-mentioned voltage divider resistors 202 and 203 and permits adjusting the speed for motor NC1.

A resistor 218 connects the suppressor grid of tube T9 to a circuit point between resistors 214 and 215. The control grid of tube T9 is connected through a resistor 219 to a lead 221 attached to the cathode of the control section of tube T8 and to the cathode lead 254 of the armature-rectifier circuit.

The grids of the thyratrons T6 and T7 are connected through resistors 222, 223 to two secondaries 224, 225 of a transformer TR5 whose primary 226 is energized from the secondary 137 of power transformer NTR through a phase shift circuit comprising a resistor 227 and a capacitor 228. The secondaries 224 and 225 of transformer TR5 are connected to a network NTW composed of four resistors 231, 232, 233, 234 and rheostat 235. A lead 236 connects network NTW to the tap point of a voltage divider which is formed by two resistors 237, 238 and energized from a suitable source 239 of direct-current voltage. A lead 241 connects resistor 238 to the plate of tube T9.

The grid circuit of thyratron T6 extends as follows:

Grid of T6—222—224—NTW—235—232—236—238—241—212—251—214 — 215 — 217 — 204 — 201—cathode of T6. (C)

The grid circuit of thyratron T7 extends from the grid through resistor 223 and transformer secondary 225 to network NTW, and thence, through the subsequent elements of the just-recited grid circuit (C) of tube T6, to the cathode of tube T7.

The grid circuit (C) of thyratron T6 includes several sources of component grid voltages. One of these voltage components (E1) is alternating and is supplied by the transformer secondary 224 and phase adjusted by the adjustment of rheostat 235 in network NTW. The constant voltage drops across resistors 238, 214 and 215 may be considered to provide together a component bias voltage (E2) of constant magnitude. The voltage drop across the load resistor 212 supplies another component direct-current voltage (E3), but this voltage varies in dependence upon the operation of tubes T9 and T8 and has an automatic regulating function as will be explained below. Another direct-current voltage component (E4) is impressed on the grid circuit by the voltage drop across the tapped-off portion of the speed adjusting rheostat 217, and this voltage (E4) is selectively adjustable in order to set the motor speed for the desired value. The grid circuit of tube T7 includes also the just-mentioned sources of component direct-current grid-voltages E2, E3 and E2, while an alternating grid voltage component (E1') is provided by transfer secondary 225.

During the normal operation of the register regulator and as long as the load current in the armature circuit of motor NC1 remains below the limit value set by the current-limit rheostat 206, the tube T8 is biased to cut-off and hence nonconductive.

The speed-control tube T9 is normally biased to operate with medium conductivity so that its load resistor 212 has a corresponding medium voltage drop. Since, as explained above, the resistor 212 is a common source of grid voltage for the two thyratrons T6 and T7, both thyratrons operate at a medium firing angle to provide normal voltage for the motor load circuit.

Assume now that, due to a decrease in load, the motor speed rises above the correct value. Then, the voltage across armature 171 increases accordingly, and the voltage drop across the voltage-measuring resistor 203 becomes proportionately higher. Resistor 203 is a source of component grid voltage in the following grid circuit for tube T9:

Control grid of T9—219—221—203—204—217—cathode of T9. (D)

Hence, the increase in voltage across resistor 203, acting in series-opposition to the speed reference voltage adjusted at rheostat 217, causes the control grid of tube T9 to become more positive with respect to the appertaining cathode, and tube T9 conducts more current so that the voltage drop across its load resistor 212 increases in an amplified degree as compared with the voltage change across resistor 203. As also explained, load resistor 212 forms a common part of the grid circuits of thyratrons T6 and T7 (see circuit C). Hence, the amplified voltage drop (E3) across resistor 212, acting in series-opposition to the constant reference grid bias (E4), renders the resultant direct-current bias $$(E2+E4-E3)$$

of the thyratron grid voltage less positive. Thus, the two thyratrons T6 and T7 are phased back, and their decreased firing angle causes the rectified voltage to be reduced. In this manner, the voltage across the motor armature and therefore the motor speed are decreased to the previous value.

When, for instance due to an increase in motor load, the speed drops below the correct value, the accompanying reduction in voltage drop across resistor 203 has the effect of decreasing the conductance of tube T9 so that the voltage drop (E3) across load resistor 212 declines and causes an increase in firing angle of tubes T6 and T7, thus increasing the rectified voltage across motor armature 171 to return the motor to the normal speed value.

As a result, the motor speed is maintained substantially at the value determined by the setting of rheostat 217 regardless of load variations. If desired, the accuracy of speed regulation can be increased by providing for IR drop compensation in a known manner (not shown).

The just-mentioned speed regulation is alone effective in the armature control system as long as the armature current remains below the safe maximum value. If this value is exceeded, for instance, due to the occurrence of an excessive motor load, the following protective function, controlled by tube T8, is superimposed. Any increase in load current causes a corresponding increase in voltage drop across the current-measuring resistor 201. Resistor 201 forms a source of control voltage in the circuit of grid 207 for tube T8: 207—208—206—201—221—255.

In this circuit, the voltage drop of resistor 201 acts in series-opposition to the adjusted bias voltage across the tapped-off portion of current-limit rheostat 206. As long as the armature current remains below the safe limit, the voltage drop across resistor 201 is not sufficient to overcome the cut-off bias of tube T8. An excessive current increase, however, causes the grid 207 of tube T8 to become less positive, relative to the appertaining cathode, so that tube T8 conducts current between leads 251 and 255 in the circuit: 216—251—T8—255—221—203—204—217—252—216. This current causes corresponding voltage drops across resistor 203 and across the tapped-off portion of rheostat 217, respectively. As mentioned, resistor 203 and rheostat 217 form part of the control grid circuit (D) for tube T9. Consequently, the just-mentioned voltage drops across resistor 203 and rheostat 217 have the effect of making the control grid of tube T9 more positive relative to the cathode so that tube T9 begins to conduct current through its load resistor 212.

Thus, the voltage drop across resistor 212 increases, and since this resistor, as explained above, is one of the sources of component grid voltage for the thyratron tubes T6 and T7 (see circuit C), the positive component grid bias on the thyratrons is reduced, and the firing angle of tubes T6 and T7 is phase shifted so as to decrease the rectified energizing voltage for the motor armature 171. In consequence, the armature current is regulated back to the limit value set by the current limit rheostat 206.

In review, it will be recognized that the armature control system permits setting the motor speed at any desired value within the available speed range (for instance of 1 to 10) so that the control system can be adjusted to the particular requirements of different applications, such as differences in gear ratios at different printing presses, merely by selecting a proper adjustment of the speed control rheostat 217, and that the system will then operate to maintain the motor speed substantially at the adjusted value.

It will also be apparent that the armature control system can readily be set for the current-limit value proper for any particular installation merely by setting the current-limit rheostat 206 accordingly. In this manner, a proper and smooth acceleration of the compensator motors is secured. When the motors run under a continuing overload, the current-limit control has, of course, the effect of reducing the motor speed below the desired value, but the net result of the current-limit control on the speed control is that the motor is then protected from being overloaded without being stopped. Customary protective devices to guard against short circuits and unduly persistent overloads may be added but are not shown in the drawings nor otherwise mentioned in this specification because such devices are well known, and do not form part of the invention proper.

While in the foregoing, our invention is described with reference to the particular embodiment of a multi-color printing press exemplified by the drawings, its components or subcombinations can be altered and modified in various respects without departing from the principles and essentials of the invention. Hence, it will be understood by those skilled in the art that the invention, as set forth in the annexed claims, includes embodiments other than the one specifically shown and described.

We claim as our invention:

1. A printing-press regulator for registering the component impressions of two separate multi-color prints under control by register marks of the respective first impressions of said respective prints, comprising a plurality of register control devices for varying the position of the respective subsequent impressions relative to the appertaining first impression, a corresponding plurality of control systems connected with said respective register control devices, each of said control systems including an electronic mixer unit with two trigger tubes interconnected and mutually interlocked for alternate operation and provided with two respective grid circuits for controlling the appertaining control device in response to changes in the time relation of two series of impulses applied to said grid circuits respectively, a single master impulse transmitter connected to one of said grid circuits of each of said mixer units to provide one of said series of impulses in a fixed phase relation to the occurrence of the register marks at the printing place of one of said first impressions, and a plurality of photoelectric scanners individually correlated to the respective subsequent impressions and responsive to the passage of the register marks near the respective printing places of the subsequent impressions, said scanners being individually connected to said other grid circuits of said respective mixer units to provide said other series of impulses.

2. A printing-press regulator for registering the component impressions of two separate multi-color prints under control by register marks of the respective first impressions of said prints, comprising a plurality of register control devices for varying the position of each subsequent impression relative to the first impression of the appertaining print, a corresponding plurality of control systems connected with said respective devices, each of said control systems including an electronic mixer unit with two trigger tubes interconnected and mutually interlocked for alternate triggering and provided with two respective grid circuits for controlling the appertaining control device in response to changes in the time relation of two series of impulses applied to said grid circuits respectively, a photoelectric master scanner connected to one of said grid circuits of each of said mixer units to provide one of said series of impulses, a rotatable body associated with said master scanner and having a surface with regularly spaced interruptions to be scanned by said master scanner, drive means for said body to rotate it in a fixed speed relation to said register marks so that the impulses of said one series occur in a fixed phase relation to the occurrence of the register marks at the printing places of said first impressions, and a plurality of photoelectric scanners individually correlated to the subsequent impressions so as to respond to the passage of the register marks near the respective printing places of the subsequent impressions, said scanners being individually connected to said other grid circuits of said mixer units respectively to provide said other series of impulses for each of said mixer units.

3. A register regulator for registering the impressions of two multi-color prints to appear on opposite sides of a traveling web, comprising two groups of register control devices for respectively varying the position of each subsequent impression relative to the first impression of the appertaining print, two groups of control systems connected with said respective devices for individually controlling each of said devices, each of said control systems including an electronic mixer unit with two trigger tubes interconnected and mutually interlocked for alternate operation and provided with two respective grid circuits for controlling the appertaining control device in response to changes in the time relation of two series of impulses applied to said grid circuits respectively, a single master impulse transmitter connected to one of said grid circuits of each of said mixer units to provide one of said series of impulses in a fixed phase relation to the printing of the first impressions of said two prints, and a plurality of photoelectric scanners individually correlated to the respective subsequent impressions so as to respond to the passage of register marks of the first impressions near the respective printing places of the subsequent impressions, said scanners being individually connected to said other grid circuits of said mixer units respectively to provide said other series of impulses for each of said mixer units, and a back-up compensator having means for engaging the web between said two groups of devices for varying the length of the web extending between the printing place of the last impression of the first print and the printing place of the first impression of the second print in order to permit placing the two prints in a desired positional relation to each other.

4. A register regulator to register on a traveling web the impressions of a multi-color print under control by register marks of the first printed impression, comprising a plurality of register control devices for varying the position of the respective subsequent impressions relative to the first impression, a corresponding plurality of control systems connected with said respective devices and having each two input circuits for controlling the appertaining control device in response to changes in the time relation of two series of impulses applied to said circuits respectively, a single master impulse transmitter connected to one of said input circuits of each of said control systems to provide one of said series of impulses in a fixed phase relation to the printing of the register marks, a plurality of photoelectric scanners individually correlated to the subsequent impressions respectively and disposed to respond to the passage of the register marks of the first impression near the respective printing places of the subsequent impressions, said scanners being movable in a direction parallel to the web travel and electrically connected to said other input circuits respectively to provide said other series of impulses for each of said control systems, and scanner displacing devices connected with said respective scanners and actuable by the operator to shift said respective scanners in said direction for manual register correction.

5. A register regulator to register on a traveling web the impressions of a multi-color print under control by register marks of the first printed impression, comprising a plurality of register control devices for varying the position of each subsequent impression respectively relative to the first impression, a corresponding plurality of control systems connected with said respective devices and having each two input circuits for controlling the appertaining control device in response to changes in the time relation of two series of impulses applied to said circuits respectively, a single master impulse transmitter connected to one of said input circuits of each of said control systems to provide one of said series of impulses in a fixed phase relation to the printing of the register marks, a plurality of photoelectric scanners individually correlated to the subsequent impressions respectively to respond to the passage of the register marks of the first impression near the respective printing places of the subsequent impressions, said scanners being movable in a direction parallel to the web travel and electrically connected to said other input circuits respectively to provide said other series of impulses for each of said control systems, adjusting devices associated with said respective scanners and having each a member for shifting the appertaining scanner ahead and back in said direction, a reversible motor in driving connection with each of said members, and operator-actuable selective means for individually controlling said motors to run in one and the other direction respectively for manual register correction.

6. A multi-color printing press regulator for registering subsequent impressions with the first impression on a traveling web under control by register marks of the first impression, comprising a plurality of compensator rolls for engaging the web between the printing place of each two successive impressions, a plurality of reversible compensator motors connected to said respective rolls for displacing them in order to establish register, a plurality of motor control systems connected with said respective motors, a plurality of manually operable contact means for selectively controlling said individual motors to displace said respective rollers in one and the other direction, a plurality of automatic register control systems connected with said respective motor control systems and having photoelectric means responsive to said register marks for causing, when in operation, said motors to vary the positions of said respective rollers so as to maintain each subsequent impression in register with the first impression, operator-actuable master control means having two selectively adjustable contact conditions and being connected with all of said motor control systems so as to disconnect said motor control systems from said automatic control systems when said master control means is in one of said conditions to then permit only an individual control of said motors by said respective manually operable contact means, and a plurality of operator-actuable unit selector switches connected between said master control means and said respective motor control systems to permit, when said master control means are in the other condition, a selective setting of each of said motors for control by said manually operable contact means and by said automatic control system respectively.

7. A register regulator for registering subsequent impressions of multi-color prints with the first impression under control by register marks of the first impression, comprising a photoelectric master scanner for issuing a series of reference impulses in a fixed phase relation to the printing of the register marks, a plurality of photoelectric color scanners responsive to the passage of the register marks near the printing places of the subsequent impressions respectively for issuing respective series of comparative impulses, a plurality of register regulating devices for varying the position of said respective subsequent impressions relative to the first impression, a plurality of control systems connected with said respective devices for controlling the latter and including each an electronic mixer unit having two trigger tubes interconnected for alternate operation and provided with two respective grid circuits for controlling the appertaining register control device in response to changes in the time relation of said series of reference impulses and one of said series of comparative impulses, a step-down transformer having a primary connected to said master scanner, a plurality of step-up transformers having respective secondaries connected to one grid circuit of each of said respective mixer units and having respective primaries connected to said secondary of said step-down transformer, a plurality of additional step-down transformers primarily connected to said respective color scanners and having respective secondaries, and a plurality of additional step-up transformers primarily connected to said latter secondaries respectively and secondarily connected to said other grid circuits respectively.

8. A register regulator for registering impressions in multi-color printing, comprising a plurality of register control motors for registering respective subsequent impression with the first-printed impression, each of said motors having an armature circuit provided with voltage regulating means for controlling the motor speed and having a field circuit for providing reversible field excitation to control the operation and running direction of said motor, said field circuit having circuit means for providing alternating current and having two controllable gaseous rectifier tubes connected in mutually inverse relation to said circuit means so that the degree and direction of said field excitation depend upon which of said two tubes has a longer interval of conductance than the other during the voltage cycle of said alternating current, each of said tubes having a control circuit for varying said conductance interval, an electronic mixer unit provided for each of said motors and having two trigger tubes interconnected and mutually interlocked for alternate operation, said two trigger tubes being plate-connected to said control circuits to provide variable control voltages therefor and having two respective grid circuits for controlling said control voltages in dependence upon changes in the time relation of two series of impulses applied to said respective grid circuits, impulse transmitting means connected to one of said grid circuits and synchronized with the first impression to provide one of said series of impulses, and photoelectric scanning means subject to register marks of the first impression near the printing place of one of said subsequent impressions and connected to said other grid circuit to apply thereto said other series of impulses, whereby said field excitation is controlled for operating said motor in the direction required to maintain said one subsequent impression in register with the first impression.

9. A register regulator for registering impressions in multi-color printing, comprising a plurality of register control motors for registering respective subsequent impressions with the first-printed impression, each of said motors having a field circuit provided with means for supplying alternating current and including two controllable gaseous rectifier tubes interconnected in inverse relation to each other to provide for said motor a field excitation whose degree and resultant polarity depend upon which of said two tubes has a longer interval of conductance than the other relative to the voltage cycle of the alternating current, each of said tubes having a control circuit for varying said conductance interval, an electronic mixer unit provided for each of said motors and having two trigger tubes interconnected and mutually interlocked for alternate operation, said two trigger tubes being plate-connected to said control circuits to provide variable control voltages therefor and having two respective grid circuits for controlling said control voltages in dependence upon changes in the time relation of two series of impulses applied to said respective grid circuits, impulse transmitting means connected to one of said grid circuits and synchronized with the printing of said first impression to provide one of said series of impulses, and photoelectric scanning means subject to register marks of the first impression near the printing place of one of said subsequent impressions and connected to said other grid circuit to provide therefor said other series of impulses, whereby said field excitation is controlled to operate said motor in the direction required to maintain said one subsequent impression in register with the first impression, said motor having an armature circuit provided with circuit means for supplying alternating current and including two controllable gaseous rectifier tubes for providing rectified armature current, said latter two tubes having respective control circuits for varying the voltage of said armature current, and voltage control means connected with said latter control circuits for varying said latter voltage in dependence upon the motor speed so as to maintain said speed normally at a constant value.

10. A register regulator for registering impressions in multi-color printing, comprising a plurality of register control motors for registering respective subsequent impressions with the first-printed impression, each of said motors having a field circuit provided with means for supplying alternating current and including two controllable gaseous rectifier tubes interconected in inverse relation to each other so that the degree and direction of the field excitation depend upon which of said two tubes has a longer interval of conductance than the other relative to the voltage cycle of the alternating current, each of said tubes having a control circuit for varying said conductance interval, an electronic mixer unit provided for each of said motors and having two trigger tubes interconnected and mutually interlocked for alternate operation, said two trigger tubes being plate-connected to said control circuits to provide variable control voltages therefor and having two respective grid circuits for controlling said control voltages in dependence upon changes in the time relation of two series of impulses applied to said respective grid circuits, impulse transmitting means connected to one of said grid circuits and synchronized with the printing of the first impression to provide one of said series of impulses, and photoelectric scanning means subject to register marks of the first impression near the printing place of one of said subsequent impressions and connected to said other grid circuit to provide therefor said other series of impulses, whereby said field excitation is controlled to operate said motor in the direction required to maintain said one subsequent impression in register with the first impression, said motor having an armature circuit provided with circuit means for supplying alternating current and including two controllable gaseous rectifier tubes for providing rectified armature current, said latter two tubes having a control circuit for varying the voltage of said armature current, a speed-adjusting potentiometer rheostat connected with said latter control circuit for providing a speed reference voltage therefor, and speed-responsive means connected with said motor and disposed in said latter control circuit to provide a variable control voltage so as to cause said latter two tubes to vary the voltage of said armature current in order to normally maintain the motor speed substantially at a value determined by the setting of said rheostat.

11. A register regulator for registering impressions in multi-color printing, comprising a plurality of register control motors for registering respective subsequent impressions with the first-printed impression, each of said motors having a field circuit and an armature circuit, an impulse transmitter for providing a series of reference impulses indicative of the position of the first impression, a photoelectric scanner located near the printing place of a subsequent impression for providing another series of impulses indicative of the position of the subsequent impression relative to the first impression, an electronic mixer unit input-connected to said transmitter and to said scanner and output-connected to said field circuit for controlling the latter to provide for said motor a field excitation of a degree and polarity dependent upon the change in time relation between said two series of impulses, said motor having an armature circuit provided with means to supply unidirectional current, regulating means in said armature circuit for controlling the voltage of said current, and adjustable rheostat means connected with said regulating means for causing the latter to control said voltage for maintaining said motor at a speed corresponding to the selected adjustment of said rheostat.

12. A register regulator for registering impressions in multi-color printing, comprising a plurality of register control motors for registering respective subsequent impressions with the first-printed impression, each of said motors having a field circuit and an armature circuit, an impulse transmitter for providing a series of reference impulses indicative of the position of the first impression, a photoelectric scanner located near the place of occurrence of a subsequent impression for providing another series of impulses indicative of the position of the subsequent impression relative to the first impression, an electronic mixer unit input-connected to said transmitter and to said scanner and output-connected to said field circuit for controlling the latter to provide for said motor a field excitation of a degree and polarity dependent upon the change in time relation between said two series of impulses, said motor having an armature, alternating-current supply means, controllable rectifier means disposed between said armature and said supply means to provide unidirectional current for said armature and having a control circuit for varying the voltage of said current, a resistor disposed in parallel to said armature and connected with said control circuit to normally cause said rectifier means to regulate said voltage for substantially constant motor speed, a resistor series-connected with said armature to develop a voltage drop indicative of the magnitude of said current, a current-limit control device connected with said control circuit and attached to said series resistor so as to impose a bias voltage on said control circuit when said current magnitude exceeds a given value in order to then cause said rectifier means to reduce the voltage of said armature current.

13. A register regulator for registering impressions in multi-color printing, comprising a plurality of register control motors for registering respective subsequent impressions with the first-printed impression, each of said motors having a field circuit and an armature circuit, an impulse transmitter for providing a series of reference impulses indicative of the position of the first impression, a photoelectric scanner located near the printing place of a subsequent impression for providing another series of impulses indicative of the position of the subsequent impression relative to the first impression, an electronic mixer unit input-connected to said field circuit for controlling the latter to provide field excitation of a degree and polarity dependent upon the change in time relation between said two series of impulses, said motor having an armature, circuit means for supplying alternating current, two controllable gaseous rectifier tubes connected between said circuit means and said armature in inverse relation to each other to provide rectified current for said armature, said tubes having respective control circuits for phase shifting the firing angle of said tubes relative to the voltage cycle of said alternating current, a resistor connected with said control circuits to provide therefor a variable voltage drop to control said phase shifting, an electronic control tube having a plate circuit which includes said resistor so that said voltage drop depends upon the conductance of said tube, said control tube having a grid circuit for varying said conductance, speed-responsive circuit means connected with said motor and disposed in said grid circuit for imposing in said grid circuit a voltage dependent upon the motor speed, adjustable circuit means disposed in said grid circuit for imposing thereon a constant reference voltage in accordance with a desired speed adjustment so that said conductance of said control tube is controlled to normally maintain the motor speed at a value substantially in accordance with said adjustment, a resistor series-connected between said armature and said rectifier tubes to provide a current-measuring voltage drop dependent upon the current flowing through said armature, circuit means connecting said series resistor with said grid circuit to superimpose on said grid circuit a bias voltage so as to cause said control tube to phase-shift the firing angle of said rectifier tubes to reduce the motor speed below said value when said current would exceed a desired limit magnitude at said speed values.

14. With multi-color printing press machinery having a plurality of successively operating presses to imprint a traveling web with differently colored impressions of which the first one includes register marks while the subsequent impressions are superimposed on the first one, the combination of a register regulator comprising a plurality of compensator rollers disposed between each two of said presses to engage a loop portion of the web and being displaceable to vary the length of the loop portion, a plurality of reversible compensator motors connected with said rollers respectively for positioning said rollers, a plurality of electronic control systems for said respective motors, each system having a mixer unit with two mutually interlocked trigger tubes having two respective grid circuits for controlling the appertaining motor in response to changes in time relation between two series of impulses applied to said respective grid circuits, an impulse transmitter having a movable member mechanically connected with said machinery and being electrically connected to one of said grid circuits of said mixer units to provide one of said series of impulses, and a plurality of photoelectric scanners disposed, respectively, near the presses for printing said subsequent impressions for scanning said register marks, each of said scanners being located between one of said latter presses and the preceding one of said compensator rollers and being electrically connected to the other grid circuit of the one mixer unit appertaining to the compensator motor of said one roller for providing said other series of impulses, said scanners being movable in a direction parallel to the web travel and having individual adjusting means for displacing each scanner in said direction.

15. In combination, a multi-color printing press having two groups of printing presses for producing two color prints on both sides of a traveling web by superimposing upon one another a plurality of differently colored impressions in each of said groups under control by register marks of the first impression of each group, a common drive shaft mechanically connected with said presses of both groups to operate them in a fixed speed relation to each other, an impulse transmitter having a rotatable member mechanically connected with said shaft for issuing a series of impulses in a fixed relation to the occurrence of the register marks, a plurality of photoelectric scanners, one for each of said presses excepting the presses that produce the first impressions in said two respective groups, each of said scanners being focused onto said register marks near the entrance of said web into the one press associated with said scanner so that said scanner issues a series of impulses in response to said marks, a plurality of compensator rollers disposed between each two of said presses to engage a loop portion of the web and being displaceable to vary the length of the loop portion, a plurality of reversible compensator motors connected with said respective rollers for positioning said rollers, a plurality of electronic control systems for said respective motors, each system having a mixer unit with two mutually interlocked trigger tubes having two respective grid circuits connected of which one is connected to said impulse transmitter while the other grid circuit is connected to the one scanner associated with the press immediately following the one compensator roller to be controlled by the mixer unit so that the motor appertaining to said latter roller is controlled in accordance with changes in time relation between the series of impulses issued by said transmitter and the series of impulses issued by said one scanner.

16. With multi-color printing press machinery having a plurality of successively operating presses to imprint a traveling web with differently colored impressions of which the first one includes register marks while the subsequent impressions are superimposed on the first one, the combination of a register regulator comprising a plurality of compensator rollers disposed between each two of said presses to engage a loop portion of the web and being displaceable to vary the length of the loop portion, a plurality of reversible compensator motors connected with said rollers respectively for positioning said rollers, a plurality of electronic control systems for said respective motors, each system having two respective input circuits for controlling the appertaining motor in response to changes in time relation between two series of impulses applied to said respective circuits, a rotatable scanning wheel having regularly spaced surface interruptions and being mechanically connected to said presses so that said interruptions move in a fixed relation to the movement of said register marks, a photoelectric master scanner focused onto said wheel for issuing one of said series of impulses in response to the passage of said interruptions, a plurality of photoelectric scanning devices, one for each of said presses with the exception of the one press producing the first impression, each of said scanning devices being focused onto said register marks near the entrance of said web into the one press associated with said scanner so that said scanner issues a series of impulses in response to said marks, one of said circuits of each control system being connected to said master scanner and said other circuits being individually connected to said respective scanning devices.

17. A combination as set forth in claim 16, comprising operator-controllable control means in engagement with said master scanner for displacing the latter in opposite directions substantially along the path of travel of said interruptions.

FRANCIS T. BAILEY.
STEPHEN L. BURGWIN.

REFERENCES CITED

The following references are of record in the file of this patent:

UNITED STATES PATENTS

| Number | Name | Date |
|---|---|---|
| 2,151,570 | Shoults et al. | Mar. 21, 1939 |
| 2,230,715 | Cockrell | Feb. 4, 1941 |
| 2,250,209 | Shoults et al. | July 22, 1941 |
| 2,356,567 | Cockrell | Aug. 22, 1944 |
| 2,396,706 | Kott | Mar. 19, 1946 |